Nov. 25, 1947.   F. H. BLANDING   2,431,455
CONTACTING LIQUIDS WITH GASEOUS FLUIDS
IN THE PRESENCE OF SOLID PARTICLES
Filed Dec. 24, 1943
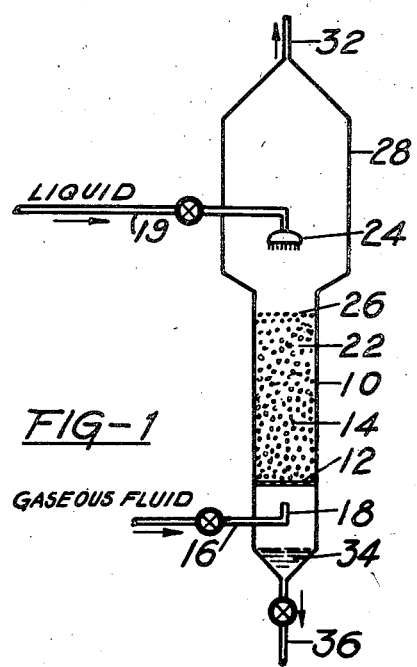
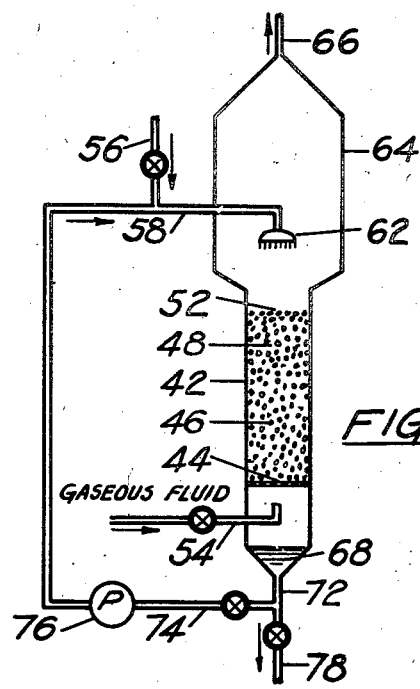
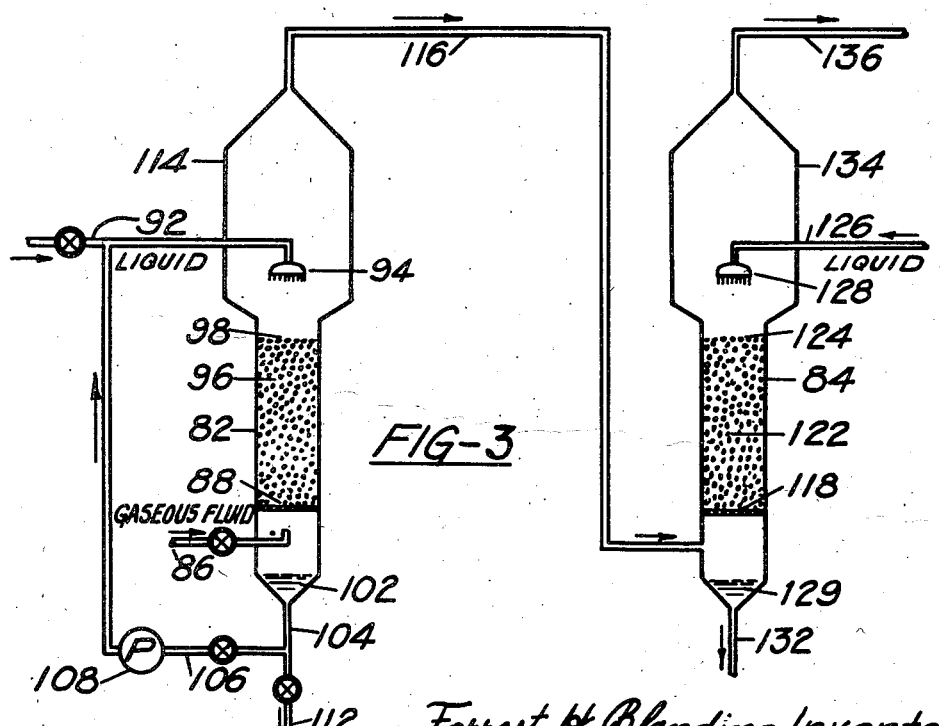
Forrest H. Blanding Inventor
By ____ Young Attorney Patented Nov. 25, 1947

2,431,455

UNITED STATES PATENT OFFICE 2,431,455

CONTACTING LIQUIDS WITH GASEOUS FLUIDS IN THE PRESENCE OF SOLID PARTICLES

Forrest H. Blanding, Elizabeth, N. J., assignor to Standard Oil Development Company, a corporation of Delaware Application December 24, 1943, Serial No. 515,513

13 Claims. (Cl. 23—1)

This invention relates to contacting liquid with gaseous fluid in the presence of solid particles, and more particularly, relates to carrying out the contacting step or steps in a vessel containing a turbulent mass of fluidized wet discrete solid particles.

In contacting liquids with gaseous fluids, vessels have been used which are provided with contacting means, such as spray towers with baffles, packed towers, bubble cap towers, etc. Where packed towers are used, the packing in the tower remains stationary in the tower when the process is being carried out. The removal of dispersed dust or powder in a gas presents quite a problem. Ordinary spray towers are almost useless and bubbling the gas through a liquid is quite ineffective. Towers or baffled chambers which are efficient are necessarily high, operate with relatively high pressure drops, are subject to choking up, and have to be frequently cleaned.

My invention differs from packed towers and other devices heretofore used in that a bed of solid contact particles is maintained in the contacting zone or section. Gaseous fluid is passed upwardly through the bed of solid particles and liquid is introduced at the top of the tower or vessel and flows down through the bed of solid particles. The gaseous fluid passing upwardly agitates the solid particles and a turbulent mass or mixture results whereby better contact between the liquid and gaseous fluid and/or solid particles is obtained.

My invention has broad application to contacting processes as above generally set forth. Preferably coarse granular solid particles which resist attrition are used in the contacting vessel or zone. The solid particles are supported on a grid or perforated member arranged in the lower portion of the contacting vessel. The grid is provided with holes just small enough so that the granular particles will not pass downwardly through them. A gaseous fluid is then continuously passed upwardly through the grid at a sufficient velocity to fluidize the solid particles and to form a turbulent bed of solid particles. The gaseous fluid passes upwardly through the bed of solid particles. In the fluidized condition the solid particles are violently mixed and are kept in a turbulent and mixed condition.

Scrubbing liquid is introduced above the fluidized bed of solid particles and the liquid flows downwardly through the fluidized bed and the scrubbing liquid maintains the bed thoroughly wet while the violent mixing of the contact particles is continued. Sufficient liquid is introduced continuously so that it flows down through the bed and drains down through the grid supporting the granular bed. The bed of contact particles is maintained in a turbulent and mixed condition by the upward passage of gaseous fluid. Where the gaseous fluid contains a dust or finely divided particles, the scrubbing liquid removes these particles and the liquid removed from the bottom of the vessel contains the dust or finely divided particles as a liquid slurry.

It has been found that if the gaseous fluid contains dust or catalyst fines, the gaseous fluid can be scrubbed to recover the catalyst fines by passing the gaseous fluid upwardly through a bed of coarse granular particles to maintain the granular contact particles in a turbulent condition and then introducing water or other scrubbing liquid into the top of the vessel above the fluidized bed of granular particles.

Sufficient scrubbing liquid is introduced to thoroughly wet the granular contact particles while maintaining the violent mixing of the solid particles in the contacting vessel. Due to the violent mixing of the liquid and solid contact particles, the dust or catalyst fines are substantially completely scrubbed out of the gas. The scrubbing liquid is withdrawn from the bottom of the vessel. The scrubbing liquid contains scrubbed out catalyst fines as a slurry and the catalyst fines may be recovered by settling, filtering, or other methods.

My invention may also be used for scrubbing catalyst fines from hot regeneration gases. Cottrell precipitators have not worked out entirely satisfactory for the removal of catalyst fines from regeneration gases. My invention may also be used for absorbing desired constituents from gases by scrubbing the gases with an absorption liquid flowing down over coarse granular contact particles maintained in a violent or turbulent condition by the upwardly flowing gases. In this way better contact between the absorption liquid and gases is obtained.

Also, my invention may be used to carry out chemical reactions between a liquid and a gaseous fluid or a liquid and solid particles. The solid particles may be the contact solid particles in the reaction zone or the solid particles may be a powdered catalyst which is introduced into the contacting zone for accelerating the reaction. The reaction products are removed by draining of the liquid from the coarse granular contact particles or if the reaction products are gaseous, they are removed overhead from the vessel.

In the drawing,

Fig. 1 represents one form of apparatus which may be used in carrying out my invention;

Fig. 2 represents another form of apparatus in which liquid withdrawn from the bottom of the contacting zone is at least in part recirculated as part of the scrubbing liquid; and Fig. 3 represents another form of apparatus in which two contact vessels are used in series.

Referring now to the drawing, the reference character 10 designates a contacting section provided with a grid member 12 in its lower portion for supporting a bed of granular contact particles such as shown at 14. The openings in the grid member 12 are sufficiently small to prevent passage of the granular particles down through the grid member.

Arranged below the grid member is an inlet line 16 provided with a distributing head 18 for supplying gaseous fluid beneath the grid member 12 for passage upwardly through the coarse granular particles. The coarse granular particles have a size of about 40 mesh to as large as 2 inches, preferably about 4–20 mesh. The granular particles should be relatively hard so that they are not subject to attrition. For example, hard coal or hard shale may be used. If attrition resistant catalyst particles are available, they may be used as the granular material or may be used as catalyst in a chemical reaction in the contacting zone.

In the form shown in Fig. 1, the simplest process would be the removal of solid constituents from a gaseous fluid. The gaseous fluid entering at 16 would contain solid constituents which it is desired to remove. The suitable scrubbing liquid is introduced through line 19 above the bed 22 into the contacting zone. The line 19 is preferably provided with a distributing means or shower head 24 for distributing the liquid in a plurality of sprays.

The scrubbing liquid thoroughly wets the granular contact particles forming part of the bed 22 and as a result, the bed is violently mixed by the upward passage of the gaseous fluid and by the presence of the scrubbing liquid and contact particles in the bed 22.

The velocity of the gaseous fluid passing through line 16 is selected to maintain the bed 22 in a turbulent mixed condition. While the level of the bed is shown diagrammatically at 26, it will be understood that the level 26 is not quiescent but is much more like the surface of a violently boiling liquid. Some of the liquid and solid particles will be thrown upwardly from the bed 22 into the enlarged space or chamber 28. However, the main body of the solid particles and liquid and gaseous fluid is maintained in agitated condition in the contacting zone.

The enlarged chamber 28 above the bed 22 is shown as having a larger diameter than the contacting section 28. Due to the enlarged cross sectional area there is a reduction in the velocity of the scrubbed gaseous fluid leaving the contacting section 10 and passing into the enlarged chamber. With this reduction in velocity there is separation of solid particles and liquid which may have passed into the enlarged chamber 28. The scrubbed gases leave the top of the enlarged chamber 28 through line 32.

Scrubbing liquid is continuously introduced through line 19 and gaseous fluid to be scrubbed is continuously passed through line 16. The scrubbing liquid passes down through the turbulent bed of contact particles and forms a slurry with the dust or finely divided particles which are scrubbed out of the gaseous fluid. Where desired, soluble constituents are removed from the gaseous fluid introduced through line 16, the scrubbing or absorption liquid which passes down through the bed contains the desirable constituents in solution.

The scrubbing liquid collects in the bottom of the vessel 10 as shown at 34 and is continuously or periodically withdrawn through bottom draw-off line 36.

Where the scrubbing liquid withdrawn through line 36 contains catalyst particles, the catalyst particles are recovered from the liquid by filtering, settling, or other suitable methods. In a catalytic cracking operation where the regeneration gases contain finely divided catalyst particles, the catalyst particles may be recovered by passing them through line 16 and scrubbing them in the contacting zone 10 with water. The slurry withdrawn from the bottom of the vessel through line 36 may be introduced into the reactor or regenerator in the catalytic cracking system to vaporize the water and recover the catalyst particles.

As a scrubbing liquid water may be used but preferably liquids having a lower surface tension than water are used. Wetting agents, such as "aerosol," may be used but only extremely small amounts are added to water to prevent foaming in the contacting section 10. Light hydrocarbon oils may be used as scrubbing liquids.

The apparatus shown in Fig. 1 may also be used for carrying out chemical reactions in the presence of solids, such as reactions between a liquid and a gas, liquid and a solid, or either of the above reactions in the presence of catalyst particles. If the reaction products are liquid, they are withdrawn from the bottom of the vessel 10 through line 36. If the reaction products are vaporous, they are withdrawn from the top of the enlarged chamber 28 through line 32.

Referring now to Fig. 2, the apparatus is substantially the same as that shown in Fig. 1 with the exception that the slurry withdrawn from the bottom of the contacting zone is recycled as at least part of the scrubbing liquid. The apparatus shown in Fig. 2 will be briefly described. The contacting section 42 is provided with a grid member 44 upon which rest the granular particles 46. The bed 48 has a level diagrammatically indicated at 52. Gaseous fluid is introduced below grid member 44 through line 54. Fresh scrubbing liquid is introduced through line 56 and line 58 provided with a distributing means or spray head 62 above the bed 48. The enlarged chamber 64 is arranged above the contacting vessel 42 and has a top outlet 66. Scrubbing liquid, after having passed through the bed 48 collects in the bottom of the vessel 42 as shown at 68. In cases where the gaseous fluid contains only small amounts of dust or catalyst fines, it is desirable to build up the concentration of the slurry before withdrawing it from the scrubbing section. The scrubbing liquid containing some dust or catalyst particles is withdrawn from the bottom of the vessel 42 through line 72 and passed through line 74 by pump 76 and returned through line 58 to distributing means 62 as scrubbing liquid. When the slurry accumulating in the bottom of the contacting section 42 has the desired concentration, it is withdrawn through line 78 and the recovered dust or catalyst particles are separated in any desirable manner.

Referring now to Fig. 3, there are shown two scrubbing sections 82 and 84 in series. Gaseous fluid to be scrubbed is introduced into the first scrubbing section through line 86 below grid member 88 which supports the granular material in the contacting section 82. Scrubbing liquid is introduced through line 92 and through spray means 94 above the bed 96 of granular contact material in the first contacting section 82. The contacting bed has a level diagrammatically shown at 98.

The scrubbing liquid containing material scrubbed from the gaseous fluid is collected at the bottom of the first contacting section 82 as shown at 102. Where the gaseous fluid contains dust or catalyst particles, the scrubbing liquid withdrawn from the bottom of the scrubbing section 82 may be only a dilute slurry and it may be desirable to recirculate this slurry through the scrubbing section in order to increase the concentration of the solid particles in the slurry. The slurry is withdrawn through line 104 and passed through line 106 by pump 108 and returned to line 92 for introduction again as scrubbing liquid above the contacting section 82. After the concentration of the slurry has been built up to a desired value, at least a part of the slurry is withdrawn from the scrubbing system through line 112. The catalyst may be recovered in any suitable manner.

In the scrubbing section 82 the granular contacting material is maintained in turbulent condition by the upwardly flowing gaseous fluid as above described in connection with Fig. 1. The enlarged chamber 114 is arranged above the level 98 of the bed in order to provide additional settling space for allowing separation of any granular material which may have been forced upwardly beyond the level 98 of the bed 96.

The scrubbed gaseous fluid leaves the top of the enlarged chamber 114 through line 116. If the gaseous fluid contains some entrained dust or catalyst particles which were not removed in the first scrubbing section 82, they are passed through the second scrubbing section 84. Or this arrangement shown in Fig. 3 may be used to carry out separate treatments of the gaseous fluid in the separate scrubbing sections 82 and 84.

The gaseous fluid passing through line 116 is introduced below grid member 118 supporting the granular bed 122 in the second contacting or scrubbing section 84. The bed of contact material has a level generally indicated at 124. Scrubbing liquid is introduced through line 126 provided with a spray means 128.

Scrubbing liquid which passes downwardly through the bed of contact material and through the grid member 118 is collected in the bottom of the vessel as shown at 129 and is withdrawn through line 132.

An enlarged vessel or chamber 134 is arranged above the contacting section 84 to provide an additional settling or separating means as above described in the other forms of the invention. Scrubbed gaseous fluid leaves the top of the enlarged chamber 134 through line 136.

The form of the invention shown in Fig. 3 may also be used for absorbing desired constituents from gaseous fluids or it may be used for carrying out chemical reactions between a liquid and a gas, a liquid and a solid, or either of these reactions in the presence of finely divided catalytic material. Also, by using two scrubbing sections in series as shown in Fig. 3, the length of the scrubbing sections or contacting sections may be reduced.

My invention may also be used in the fractionation of vapors by fractional distillation. In this case separate beds of contact material are provided in a tower and each bed is violently agitated by the vapors passing upwardly through the beds while the vapors are contacted with scrubbing liquid passing downwardly through each bed.

In the form of the invention shown in Fig. 2, the bed 48 is maintained in a violently agitated condition similar to that described in connection with bed 22 shown in Fig. 1.

With the arrangement shown in the three figures in the drawing, a relatively cheap process is provided for scrubbing out solids from gases, for absorbing desired constituents from gases, or for carrying out chemical reactions. The scrubbers or scrubbing sections are relatively small compared to packed or spray towers used for scrubbing solids from gases. The apparatus shown in the drawing operates with a relatively small pressure drop through the agitated bed. The velocity of the gaseous fluid is sufficiently high to move the gas upwardly through the fluidized wet bed of contact granular material.

An example of my invention as applied to recovery of catalyst fines from regeneration gases will now be given. Catalyst particles from a cracking operation are regenerated in a regeneration zone at a temperature below about 1200° F. The regeneration gases may be passed through cyclone separators to remove most of the entrained particles. However, the regeneration gases still contain entrained catalyst and in some of the systems the regeneration gases are cooled and then passed to an electrical precipitator for recovering substantially all of the catalyst fines entrained in the regeneration gases.

The regeneration gases, instead of being passed through the electrical precipitator, are introduced through line 54 in Fig. 2 at a temperature of about 700–1100° F. The contact granular material forming the bed 48 in the scrubbing section 42 comprises shale particles or hard rock having a size of about 20 mesh to 40 mesh.

The scrubbing liquid introduced through line 56 is water containing about 1/1000 part of "aerosol." The water is at a temperature of about 100° F. About 5–15 gallons of water per minute per square foot of cross-sectional area are introduced into the scrubbing section 42 through line 56 and line 58. The velocity of the regeneration gases passing up through the wet fluidized bed 48 is about 10 ft./second.

The water slurry withdrawn from the bottom of the scrubbing section 42 contains about 0.5 lb. of catalyst per gallon of water. To increase the concentration of the catalyst in the water, the slurry is recirculated through line 74 as scrubbing liquid and again introduced through spray means 62. If desired, a heat exchanger or cooler may be placed in line 74 for cooling the recirculated slurry. Heat can be recovered from the heat exchanger and better recovery of catalyst is obtained due to contraction of gases on cooling and the gases give up entrained particles more readily. The scrubbing medium may be a liquid higher boiling than water and the recovered heat may be used to manufacture steam.

The regeneration gases leaving the top of the enlarged chamber 64 through line 66 are substantially completely free of entrained catalyst particles. When the catalyst concentration builds up to about 1–2 lbs./gallon of water, it is withdrawn through line 78 and the catalyst fines are recovered by settling, filtering, centrifuging, or the like, or the catalyst slurry may be directly introduced into the regenerator where the water is vaporized and the catalyst particles are recovered.

When using shale as the contacting granular material in the contacting section 42, the density of the wet fluidized mixture is about 25 lbs./cu. ft. The pressure on the gaseous fluid being introduced through line 54 is about 3–4 lbs./sq. in. where the height of the fluidized wet bed of contact material 48 is about 20 ft.

Instead of using one perforated plate or grid and one bed of contacting solids, the vessel may be provided with a plurality of perforated plates and/or baffles with divided contacting solids on each plate. With this form of the invention increased efficiency of the process is obtained.

My invention may also be used for dissolving solids in liquids in cases where the large solid material is somewhat difficult to dissolve. Also my invention may be used to wash large solid particles with washing liquid and the large particles could be added and withdrawn in a fluidized condition.

My invention may also be used for scrubbing catalyst particles from gases using topped fresh oil feed as a scrubbing medium. The oil feed is preferably heated to make it flow readily but is not heated too high to cause appreciable loss by vaporization.

The form of the invention shown in Fig. 3 may also be used for scrubbing hot regeneration gases containing entrained catalyst particles with fresh hydrocarbon feed oil in scrubber 82 to preheat the feed oil and to recover catalyst from the regeneration gases. The catalyst particles are recovered in an oil slurry. The cooled regeneration gases containing some vaporized oil and catalyst particles are then passed to second scrubber 84 wherein they are scrubbed with water to condense and recover vaporized hydrocarbons and to recover the last traces of catalyst particles.

While I have shown several forms of my invention and have given one specific example of a scrubbing process, it is to be understood that these are by way of illustration only and modifications and changes may be made without departing from the spirit of my invention.

I claim:

1. A process for contacting gaseous fluids and liquids which comprises providing a bed of solid particles of a size up to about 4 mesh in a contacting zone, passing gaseous fluid upwardly through said bed at a velocity sufficient to fluidize the particles and to cause violent agitation of the solid particles in said bed, passing liquid generally downwardly through said bed to contact the gaseous fluid while maintaining the violent agitation of the solid particles in said contacting zone, removing gaseous fluid from above said contacting zone and removing liquid from the bottom of said contacting zone.

2. A process according to claim 1 wherein the gaseous fluid leaving said contacting zone is passed to a second contacting zone wherein it is contacted with liquid while the solid particles in said second contacting zone are violently agitated.

3. A process for removing dust from gaseous fluid which comprises providing a relatively deep bed of solid particles of about 4 to 20 mesh size in a contacting zone, passing dust laden gaseous fluid upwardly through said bed at a velocity sufficient to fluidize the particles and to cause violent agitation of the solid particles without removing a substantial amount of the solid particles from said contacting zone, introducing a scrubbing liquid above said bed so that the scrubbing liquid flows generally downwardly through said bed to scrub the upflowing gaseous fluid while maintaining the solid particles in violently agitated condition, removing substantially dust-free gaseous fluid from above said contacting zone and removing liquid slurry containing the scrubbed-out dust from the bottom of said contacting zone.

4. A process according to claim 3 wherein the slurry is at least in part recirculated and used as scrubbing liquid in said contacting zone to increase the concentration of the slurry.

5. A process according to claim 3 wherein the gaseous fluid comprises regeneration gases and the dust comprises catalyst fines from a hydrocarbon conversion-catalyst regeneration system.

6. A process for carrying out chemical reactions which comprises providing a bed of solid particles up to about 4 mesh in size in a contacting zone, passing a gaseous reactant upwardly through said bed at a velocity to fluidize the particles and to cause violent agitation of the solid particles, passing a liquid reactant generally downwardly through said bed to contact the gaseous reactant while maintaining the violent agitation of the solid particles, maintaining reaction conditions in said contacting zone and removing reaction products from said contacting zone.

7. A process for contacting gaseous fluids and liquids which comprises providing a relatively deep bed of relatively coarse solid particles up to about 4 mesh in size above a perforated grid member in a contacting zone, passing gaseous fluid upwardly through said grid member and through said bed at a velocity to fluidize the particles and to cause violent agitation and turbulence of the solid particles in the bed, passing liquid generally downwardly through said bed to contact the gaseous fluid while maintaining the violently agitated and turbulent condition of the solid particles so that the upper surface of the wet fluidized bed has an appearance of a violently boiling liquid and some of the coarse solid particles and liquid are thrown upwardly from the bed, removing gaseous fluid from above said contacting zone and removing liquid from below said grid member.

8. A process according to claim 7 wherein the gaseous fluid contains suspended particles of a smaller size than the particles in the bed and the suspended particles are scrubbed out of the gaseous fluid and withdrawn with the liquid as a slurry.

9. A process according to claim 7 wherein the liquid comprises water containing a small amount of a wetting agent.

10. A process according to claim 7 wherein the liquid comprises light hydrocarbon oil.

11. A process according to claim 1 wherein the liquid comprises water.

12. A process according to claim 1 wherein the liquid comprises light hydrocarbon oil.

13. A process for contacting gaseous fluid and liquids which comprises providing a bed of coarse granular particles up to about 4 mesh in size in a contacting zone, passing gaseous fluid upwardly through said bed at a velocity sufficient to fluidize the particles and to cause violent agitation of the granular particles in said bed without removing a substantial portion of the solid particles overhead from said contacting zone, passing liquid generally downwardly through said fluidized bed to contact the upflowing gaseous fluid and to thoroughly wet the granular particles while maintaining the violent agitation of the granular particles in said bed so that the upper surface of the wet fluidized bed has an appearance of a violently boiling liquid, removing gaseous fluid from above the level of said bed in said contacting zone and removing liquid from the bottom of said contacting zone.

FORREST H. BLANDING.

REFERENCES CITED

The following references are of record in the file of this patent:

UNITED STATES PATENTS

| Number | Name | Date |
| --- | --- | --- |
| 2,253,261 | Bacon | Aug. 19, 1941 |
| 2,160,549 | Kurth | May 30, 1939 |
| 1,816,525 | Gutensohn | July 28, 1931 |
| 2,273,075 | Weems | Feb. 17, 1942 |
| 1,141,266 | Raschig | June 1, 1915 |
| 2,361,978 | Swearingen | Nov. 7, 1944 |

FOREIGN PATENTS

| Number | Country | Date |
| --- | --- | --- |
| 121,752 | Great Britain | Jan. 9, 1919 |